United States Patent [19]

Kawakami et al.

[11] Patent Number: 5,039,717

[45] Date of Patent: Aug. 13, 1991

[54] COPOLYESTERS

[75] Inventors: James H. Kawakami, Piscataway; Lloyd M. Robeson, Whitehouse Station; Bernard Cooker, Piscataway, all of N.J.; Lee P. McMaster, Brookfield, Conn.; Louis M. Maresca, Pittsfield, Mass.

[73] Assignee: Amoco Corporation, Chicago, Ill.

[21] Appl. No.: 304,042

[22] Filed: Jan. 30, 1989

Related U.S. Application Data

[63] Continuation of Ser. No. 758,720, Jul. 25, 1985, abandoned.

[51] Int. Cl.$^5$ .............................................. C08L 67/02
[52] U.S. Cl. .................................... 523/100; 524/451; 525/437; 528/195
[58] Field of Search ................... 524/451; 528/195; 523/100; 525/437

[56] References Cited

U.S. PATENT DOCUMENTS

| | | | |
|---|---|---|---|
| 3,288,755 | 11/1966 | Griehl | 528/195 |
| 3,778,410 | 12/1973 | Kuhfuss | 528/195 |
| 3,804,805 | 4/1974 | Kuhfuss | 528/195 |
| 4,035,356 | 7/1977 | Jackson | 528/195 |
| 4,124,561 | 11/1978 | Phipps | 524/451 |
| 4,585,823 | 4/1986 | Saito | 524/456 |
| 4,626,557 | 12/1986 | Duska | 524/451 |

Primary Examiner—Patricia Short
Attorney, Agent, or Firm—Matthew R. Hooper; William H. Magidson; Ralph C. Medhurst

[57] ABSTRACT

Injection-moldable copolyesters of terephthalate units, ethylene units and a high proportion (e.g. 82-87) mole %) of oxybenzoate units, and cookware made of such copolyesters. Process for making such copolyesters by reacting polyethylene terephthalate with p-acetoxybenzoic acid in a solvent, first at a temperature below 240° C. to product a fragmented polyester, raising the temperature to split off acetic acid, then adding more acetoxybenzoic acid to raise the oxybenzoate content to more than 80 mole %.

7 Claims, No Drawings

COPOLYESTERS

This is a continuation of application Ser. No. 758,720, filed July 25, 1985, now abandoned.

Copolyesters made by the reaction of an acyloxyaromatic carboxylic acid (such as acetoxybenzoic acid and a polyester of a glycol and an aromatic dicarboxylic acid (such as polyethylene terephthalate) are known in the art; see for instance U.S. Pat. Nos. 3,778,410 and 3,804,805.

One aspect of this application relates to copolyesters of high oxyaromatic carboxylate (e.g. oxybenzoate) content. Another aspect of the application relates to cookware, suitable for use in both thermal ovens and microwave ovens, made from such a copolyester. Still another aspect of the application relates to a process for preparing such a copolyester.

Preferred copolyesters of this invention contain about 82 to 87 mole % of oxybenzoate units (i.e. units of the formula —OPhCOO—, where "Ph" designates a phenylene group) and have softening temperatures above 260° C. as determined (on a molded sample having a thickness of about 15 to 20 mils) by thermal mechanical analysis (e.g. by using a Perkin-Elmer TMS-1-Thermal Mechanical Analyzer using a standard three gram load for the penetrometer probe thereof, the heating rate being 10° C. per minute); the probe is a standard quartz rod about ⅛ inch in diameter having a flat end in contact with the sample.

In a preferred process for forming the copolyesters, polyethylene terephthalate (PET) is first reacted with acetoxybenzoic acid (ABA) in a high boiling solvent for the latter (e.g. diphenyl sulfone, b.p. 379° C.) at a temperature which has now been found to be low enough to promote reaction of ABA with the PET while avoiding the splitting off of substantial proportions of acetic acid from the ABA (homopolymerization) or its acidolysis product containing acetoxy groups. Temperatures below about 240° C. such as about 220° C. have been found to be suitable. This produces a solution containing dissolved "fragmented PET" having a relatively low molecular weight and containing ethylene units (—CH$_2$CH$_2$—) esterfied with terephthalate units (—OOCPhCOO—) and with acetoxybenzoate units (CH$_3$COOPhCOO—). The solution containing the fragmented PET is then heated further to a temperature at which splitting off of acetic acid is promoted, preferably well above 240° C., to cause the formation of —PhCOOPh— linkages, including such linkages as —OOCPhCOOPhCO— and —OOCPhOOCPhO— and thereby raise the molecular weight.

The process eventually results in the production of copolyester which is insoluble in the solvents conventionally employed for measuring inherent viscosity ("I.V."). Thus I.V. measurements are not here available as an indicator of molecular weight. Another indicator of the molecular weight is the melt flow (or "melt index") at high temperature; in this application the measurements of the melt flow (here designated as "MF$_{10}$") are, unless otherwise indicated, made according to ASTM D-1238 at 350° C. using a standard load of 44 psi, after the material has been in the melt flow apparatus for 10 minutes; melt flow is expressed in dg/min. For nuclear magnetic resonance (NMR) studies the polymer was dissolved at 5% concentration in triflic acid CF$_3$SO$_3$H; a Varian XL 300 instrument was used for resonance of carbon 13. The NMR studies indicated the mole ratio of the components of the final copolyester was the same as the mole ratio of the reactants used in its production.

To promote removal of acetic acid by distillation and drive the reaction to higher molecular weight it is preferred to include in the reaction mixture a liquid having a boiling point of at least about 160° C. (preferably at least about 180° C. and more preferably well above 200° C., e.g. about 260° C. or more) to act as an entrainer for the acetic acid formed during the reaction. It is best to add such an entrainer at the later stages of the process, e.g. when the reaction has proceeded to such an extent that little if any unreacted ABA is present. Thus the high boiling entrainer may be added gradually to a reaction mixture whose temperature (e.g. about 300°–320° C.) is well above the boiling point of the entrainer, and a mixture of the entrainer and acetic acid may be distilled off. It is found that by incorporating an entrainer boiling above 220° C., such as diphenyl ether (b.p. 259° C.) into a reaction mixture at a temperature above about 305° C. (such as about 310°–320° C.) the molecular weight may be increased significantly, as indicated by a decrease in the melt flow (at 350° C.) of the product.

The molecular weight may also be increased by subjecting the polymer to vacuum at elevated temperature. Temperatures at which the surfaces of the polymer particles tend to adhere lightly to each other (e.g. temperatures of about 290° C. or above) are particularly effective.

Preferably the ABA is added to the reaction mixture in stages. The amount of ABA present in the earlier stages of the reaction may be such as to provide sufficient oxybenzoate —OOCPhO— units to constitute, for example, about 60 to 80 mole % (preferably about 72 to 78, e.g. 74 mole %) of the total of oxybenzoate and terephthalate units. Heating at temperatures to drive off the acetic acid from this reaction mixture generally results in the formation of a hot clear solution of a copolyester which has a substantially random arrangement of its oxybenzoate and terephthalate units. Then additional ABA is added, preferably gradually, so that the concentration of unreacted ABA in the mixture is maintained at a relatively low level in relation to the concentration of copolyester; it appears that the added ABA reacts almost instantaneously with the copolyester at the high temperatures employed and it is believed that the weight ratio of unreacted ABA to copolyester is less than about 1:20 and the concentration of unreacted ABA in solution is less than about 1%. Heating is continued so as to increase the oxybenzoate content of the copolyester. At some stage during the addition of ABA, polymer begins to precipitate from the solution, forming a slurry of insoluble polymer particles in a solution of soluble polymer. It is believed that use of a staged procedure, particularly in solution, makes for a copolyester of high oxybenzoate content in which the oxybenzoate units are more randomly arranged. According to the scientific literature (Zachariades, Economy and Logan, J. App. Pol. Sci. 27 2009-20014 (1982) and Zachariades and Logan, Polymer Engineering and Science 23, 797-803 (1983)) the known 80/20 bulk copolymer (made as described in Kuhfuss et al U.S. Pat. No. 3,778,410) is a block material containing long blocks of p-hydroxybenzoic acid units (i.e. homopolymerized oxybenzoate units) which form crystalline domains.

The staged addition may also be effected by starting with an ABA-PET copolyester having an oxybenzoate content below about 75% (such as 60, 65 or 70%) produced by other methods (such as by the bulk-melt method disclosed in Kuhfuss et al. U.S. Pat. No. 3,778,410 or by a slurry reaction of the ABA and PET in a hot inert liquid of high boiling point) and bringing such copolyester gradually into contact with additional ABA, preferably into contact at an elevated temperature (e.g. about 300°-320° C.) with a solution of ABA in a high-boiling solvent, so as to raise the oxybenzoate content of the copolyester to, say, about 82 to 87%.

Preferably the reaction of the PET and ABA is effected in a system in which the reactants supply substantially equal numbers of alcohol and acid moieties and a high degree of initial esterification thereof. This makes it easier to produce copolyester of high molecular weight. Thus in one preferred form one starts with PET of relatively high molecular weight (e.g. I.V. about 0.6) since such a product necessarily has the desired ratio of alcohol to acid and a high degree of esterification. Thus one may use a high polymer of ethylene terephthalate such as the materials disclosed in the above-mentioned U.S. Pat. Nos. 3,778,410 and 3,804,805. It is within the broader scope of the invention to use instead (or in addition) a PET which is a cyclic oligomer (Encyclopedia of Polymer Science Vol 11 page 18) such as cyclic tris (ethylene terephthalate). The PET may be in the form of commercially available substantially crystalline pellets, or it may be in quenched amorphous form (e.g. having a glass transition temperature of about 60°-80° C.) and may be in a form presenting a larger surface for reaction than the conventional pellets, e.g. fibers or films or fine powder.

The reaction is preferably conducted under essential anhydrous conditions in an inert atmosphere (e.g. under a stream of dry nitrogen). Operation at atmospheric pressure is most convenient. If desired other pressures may be used. For instance the fragmentation of the PET by the ABA may be effected at superatmospheric pressure (e.g. about 10 psig) and the later stages of the reaction may be effected at subatmospheric pressure (e.g. about 50 mm Hg absolute).

The amount of inert solvent present in the reaction mixture is preferably more than 0.6 part (e.g. more than 1 part, such as about 1½ parts) per part of reactants.

At the conclusion of the reaction in the solvent, the hot reaction mixture generally is a slurry made up of a liquid containing some copolyester dissolved in the solvent and a solid comprising particles of copolyester insoluble in the solvent. One suitable method for recovering the product is to cool it so that the reaction mixture solidifies to a mass containing the solid particles in a matrix of solvent-polymer blend, grind the relatively brittle mass and remove the high boiling solvent by extraction with a liquid (such as refluxing acetone) which is miscible with the solvent but which does not dissolve the polymer. Alternatively a stream of the hot slurry may be quenched in the extractant liquid to precipitate any polymer dissolved in the slurry.

One may also treat the hot slurry to effect mechanical separation of the hot liquid from the insoluble solid, as by hot centrifugation or filtration or by settling (e.g. under inert atmosphere); the separated liquid containing low molecular weight polymer may then be re-used. Such re-use may be effected by adding fresh ABA and PET thereto for another run of the same reaction; or by adding previously ABA-fragmented PET to the hot liquid, advancing the reaction by heating and then adding ABA gradually to the resulting mixture for further reaction; or by dissolving in the hot liquid a copolyester of lower oxybenzoate content (such as 60, 65 or 70 mole % oxybenzoate) having an I.V. such as about 0.4, 0.3, 0.2 or less, formed by reacting ABA and PET in another manner (e.g. by bulk-melt reaction or by slurry reaction) and then gradually adding ABA and heating to react further to form a copolyester of higher oxybenzoate content.

The copolyester of high oxybenzoate content, with or without a filler, may be formed into molded articles (e.g. cookware) in any suitable manner, as by injection molding, compression molding, thermoforming or blow molding. One suitable form for injection molding may be produced by dry-mixing the copolyester with the filler, passing the mixture through a conventional plastics extruder (preferably a vented extruder), and chopping up the resulting extruded rod of polymer filler blend into pellets.

The copolyester of high oxybenzoate content, despite its high softening temperature, exhibits a low melt viscosity (particularly at high shear rates) probably owing to the fact that its opaque melt comprises thermotropic liquid crystals; it flows readily into the mold and fills it well even in thin sections.

Extrusion temperatures for forming the blend with filler and for injection molding are typically about 340°-350° C. for a polymer containing about 83 mole % oxybenzoate units produced by the process described above (somewhat higher temperatures would be employed for extruding polymers containing, say 85 or 87 mole % of oxybenzoate units). At these temperatures there is some tendency for decomposition (e.g. at aliphatic ester linkages of the copolyester), with resultant gassing and loss of molecular weight, especially if the filler provides water. To compensate for that, it is desirable to advance the polymerization to attain a molecular weight such that the $MF_{10}$ is below about 200 dg/min (e.g. about 1 to 200 dg/min, such as about 10) before subjecting the polymer to extrusion temperatures, and to use a vented extruder (permitting discharge of gas) for making blends with filler. Stabilizers may be added to inhibit decomposition at extrusion temperatures. Suitable stabilizers include free radical scavengers or peroxide decomposers (e.g. of the phosphonite or phosphite types) such as Sandostab PEPQ (tetrakis [2,4-di-t-butylphenyl]4,4'-biphenylene diphosphonite) and Weston 618 (distearyl pentaerythritol diphosphite) or mixtures thereof, e.g. 50/50 blends, in such concentrations as, for instance, about 0.1 to 0.3%. The tendency for decomposition was especially noticed for polymer accidentally contaminated with iron. For instance it was found that some products made in a stainless steel reactor contained well over 10 ppm of Fe (e.g. 45 ppm Fe) possibly due to contamination resulting from de-passivation of the reactor surfaces by other processes previously carried out in the same reactor. Product made in a glass reactor (using a stainless steel agitator) was much more stable.

Suitable fillers include talc, calcium carbonate, glass fibers, mica (e.g. muscovite or suzorite), wollastonite, or any of the other fillers and combinations of fillers conventional in the art such as those mentioned in columns 1 and 2 of U.S. Pat. No. 4,458,039 including the high quality talc described in Belgian patent No. 896,873. The filler may be pretreated with a coupling agent such as a titanate. The proportion of filler may be, for instance, in the range of up to about 70%, preferably about 20 to 60%, more preferably about 40 to 50% of the weight of the total composition.

The compositions of this application may be molded (preferably injection molded) to form cookware suitable for use in both thermal ovens and microwave ovens. Such cookware may be any type of container or tray which is used to heat or cook food. The cookware may be of any shape or design with dimensions dependent upon the desired end use. Representative cookware is found in, for example, U.S. Pat. Nos. 3,938,730; 3,743,077 and 3,955,170. Also, representative designs of cookware are described in, for example, U.S. Des. Pat. Nos. 236,574; 194,277 and 236,182. A typical article is a tray 8¾ inches wide, 8¼ inches long and 2 inches deep and about 1/10 to ⅛ inch thick. The cookware may be used to heat and bake all types of food, including frozen food in a conventional or microwave oven. In conventional ovens the temperature at times reaches 260° C. (500° F.) The cookware may be washed in conventional home automatic dishwashers. It is within the broader scope of this application to mold cookware from oxybenzoate-ethylene terephthalate copolyesters of high oxybenzoate content (e.g. 75-90 mole % oxybenzoate) which have been made in other ways, e.g. by the bulk melt polymerization as described in Kuhfuss et al U.S. Pat. No. 3,778,410. While the (lower softening temperature) polymers, having oxybenzoate contents below about, say, 82 mole percent, yield cookware which may deform undesirably at oven temperatures of 260° C. when the polymer is not filled, the incorporation of fillers improves the resistance to deformation, particularly when the filler is fibrous (e.g. glass fibers, alone or in admixture with non-fibrous fillers such as talc).

Cookware should be safe to use and not contaminate the food it contacts. Unless it is intended to be disposable after the first use, it should have the capacity of withstanding repeated washings, by hand or machine. It should be detergent resistant and not absorb food, oils and fats. It should be able to withstand warping on usage. Preferably, for household use, it should have a smooth surface, even a high gloss.

The following Examples are given to illustrate this invention further. In this application, unless otherwise indicated, proportions are by weight, pressures are atmospheric and temperatures are °C.

EXAMPLE 1

176.55 grams of powdered diphenyl sulfone (m.p. 128°-9° C.), 25.9 grams (0.135 mole) of pellets (about 1 mm in diameter) of polyethylene terephthalate ("PET") (having an I.V. of about 0.6 and in substantially crystalline form; Goodyear "Cleartuf 1002A") and 200 ml of tolune were heated in a flame-dried Pyrex glass flask to a temperature of 80° C. with a heating mantle. Then 34.45 grams (0.191 mole) of powdered p-acetoxy benzoic acid ("ABA") were added while the temperature was maintained at about 80° C. (The diphenyl sulfone and ABA are both soluble in toluene at 80° C.). As coalescence and dissolution of powders progressed the bulk volume of the contents of the flask decreased and another 34.45 grams (0.191 mole) of ABA was added. The flask was transferred to a fluidized hot sand bath and fitted with a fractionation column, mechanical stirrer, thermocouple, reflux condenser and receiver, addition funnel and a nitrogen inlet; the contents of the flask were maintained under a flow of nitrogen throughout the rest of the process. The toluene was distilled out while heating and then the temperature of the reaction mixture was raised to 250° C. over a period of about ½ hour, during which fragmentation of the PET occurred (see Example 4 below).

The reaction mixture was then heated for an additional ¾ hour to raise its temperature to 307° C. Then a solution, at about 120° C., of 68.8 grams ABA (0.382 mole), 257 ml dichlorobenzene (b.p. 173° C.) and 97.8 grams diphenyl sulfone (b.p. 378°-9° C.) was added gradually over a 16 hour period, the rate of addition being such that the reaction temperature was maintained at about 303°-307° C. During this period, polymer precipitated out gradually in the flask. Then the reaction was continued for an additional 7 hours at 305° C. while dichlorobenzene was added dropwise; the dichlorobenzene acted as a tripping solvent to help carry off, overhead, residual acetic acid in the reaction mixture. During this 7 hour period polymer continued to precipitate out gradually, while the viscosity of the hot mixture remained relatively low; the ease of stirring indicated that the viscosity was well below 1000 centipoises.

The mixture was cooled to room temperature; the entire contents of the flask solidified. The flask was then broken and the mass of polymer was ground to a fine light tan powder and then extracted with refluxing acetone to remove the diphenyl sulphone. 88.5 grams of a product believed to contain 85 mole % of $-O-C_6H_4COO-$ were obtained; this product has an $MF_{10}$ of several thousand. The powder was then maintained at 290° C. in vacuum (at an absolute pressure of 0.1 mm Hg) for 6 hrs, which caused the $MF_{10}$ to decrease to 3.73. The vacuum treatment at 290° C. converted the powder into a fused tan solid mass.

EXAMPLE 2

1411.76 grams of diphenyl sulfone, 800 ml of toluene (in two stages), 548.24 grams of ABA (3.03 moles) and 239.55 grams (1.25 moles) of the PET pellets used in Example 1 were heated in a type 316 stainless steel reactor which was heated under nitrogen, first to cause the toluene to reflux and then distill over. When most of the toluene had distilled over and the temperature of the reaction mixture had reached about 210° C. continuous mechanized stirring of the mixture was begun. The stirrer was driven by a hydraulic motor (at a substantially constant speed). The pressure of the hydraulic fluid driving the motor was monitored during the reaction; this gave an indication of the viscosity of the mixture. When the temperature of the reaction mixture reached about 250° C. (about 20 minutes after the continuous stirring began) a considerable evolution of acetic acid began. Heating for another hour raised the temperature to about 300° C. while evolution of acetic acid continued. Heating at that temperature was continued for about another 1½ hours, at the end of which little of any acetic acid was distilling over. Then a hot solution of ABA (in dichlorobenzene and diphenyl sulfone in the same concentrations as the solution used in Ex. 1) was added gradually while the reaction mixture was maintained at about 300° C., over a period of about 7 hours; the amount of ABA thus added was such as to raise the mole ratio of total ABA to PET employed to 83:17. Then the reaction was continued for an additional hour at about 300° C., after which dichlorobenzene was added slowly over a period of about 15 hours to act as a stripping solvent while the reaction temperature was maintained at about 300° C. Throughout the process the viscosity of the hot reaction mixture was low, corresponding to a viscosity which was probably well below 1000 centipoises as shown by the low hydraulic pressure needed to drive the stirrer; this pressure remained substantially constant from the time the reaction temperature reached 220° C. to the end of the process. The reactor was cooled and the resulting solid mass was ground up, giving a yield of 768.1 grams. Chunks of the resulting product were broken up in a blender with cold acetone, (to extract residual diphenyl sulfone) then extracted with hot acetone and dried. The powder was heated at 290° C. for about 8 hrs in a vacuum (at an absolute pressure of 0.1 mm) giving a yield of 734 grams. The dried finely divided product, which had an $MF_{10}$ of 80 was dry mixed with an equal weight of powdered talc and passed through a vented hot extruder (a 1 inch extruder 36 inches long, having two vents, both open to the atmosphere) to mix the talc and polymer more thoroughly, and then injection molded (using a Newburg 1¼ oz. reciprocating screw injection molding machine, with its rear temperature at 349° C., its front at 343° C. and its nozzle at 338° C. with an injection pressure of 300 psig into a mold having a temperature of 140° C.) to form molded tensile and flexure bars (⅛"×⅛"×5" in size), which had the following properties:

| Tensile Modulus (psi) | 1,160,000 |
| Tensile Strength (psi) | 7,030 |
| % Elongation | 0.97 |
| Flexural Modulus | 1,200,000 |
| Flexural Strength (psi) | 9,220 |
| $MF_{10}$ (350° C.; IP) dg/min | 512 |
| Oven Exposure at 260° C. (1 hour) | no distortion very slight surface blistering |
| Deformation after exposure at 260° C. for one hour | 0.045 inch |

In this application, tensile modulus, tensile strength and % elongation are measured according to ASTM D-638; flexural modulus and flexural strength by ASTM D-790. "Oven Exposure" represents the results of the test of "Deformation after exposure at 260° C. for one hour", which is determined on the molded flexure bars, each placed in an oven with the bar supported at its ends so that the specimen is at an angle of 26° to the horizontal. During this test the sample sags, becoming concave upward. At the conclusion of the test the cooled sample is turned over and placed on a flat horizontal surface, with its concave face down. The vertical distance between the flat surface and the highest point of the sample is measured, the thickness of the sample is subtracted from that distance, and the balance is reported as the "deformation".

The talc used in this Example was a commercial product of relatively high purity (sold as Mistron Vapor talc, a Montana talc sold by Cyprus Industrial Minerals Co.) having a particle size of about 12 microns; its iron content, expressed as % $Fe_2O_3$, was 1.5% which is higher than a preferred content of well below 1%. Prior to use in this Example, the talc was dried at 200° C. in an air draft oven for 16 hours; this dried talc was still warm when it was mixed with the copolyester. Preferred talcs are either acid-treated or low in carbonates.

Bars injection molded of a 50/50 mixture of talc and a copolyester containing 85 mole % of oxybenzoate units, produced in a manner similar to this Example 2, showed a deformation after exposure at 260° C. for one hour of 0.035 inch. The $MF_{10}$ of that copolyester was about 1.

EXAMPLE 3

33.681 grams of ABA, 14.70 grams of PET pellets, 139.74 grams of diphenyl sulfone and 100 ml of toluene were mixed and heated to 300° C. using a procedure similar to that described in Example 2. Then a hot (135° C.) solution containing 33.275 grams of ABA and 220 grams of diphenyl ether (b.p. 259° C.) were added slowly to the reaction mixture, at about 300° C., over a period of about 3 hours. The reaction mixture was then heated to, and maintained at, about 315° C. while diphenyl ether was added very slowly (and distilled off continuously) over a period of about 12 hours. The reaction mixture was cooled and the solidified product was ground and treated with acetone as in Example 1. The melt flow of the product was 461. Similar processes in which the reaction mixtures were maintained at about 310° C. and about 305° C. (instead of about 315° C.) gave products having considerably higher melt flows (such as 848 for the product prepared at 310° C. and still higher for the product made at 305° C.). When dichlorobenzene was used instead of diphenylether even at temperature of about 310° C. the melt flow value was much higher (e.g. well over 3000, when there was not subsequent step of heating under vacuum).

EXAMPLE 4

167.3 grams of diphenyl sulfone; 34.422 grams of pellets of PET (0.1793 mole) having an I.V. of 0.58; 48.442 grams (0.2689 mole) of ABA; and 100 ml of toluene were mixed and heated gradually with stirring in a Pyrex glass flask over a period of about 2 hours to distill off the toluene and raise the temperature of the mixture to 220° C. After about ½ hour more at 220° C. all the PET had dissolved. Heating at 220° C. was continued and samples of this clear reaction mixture were removed at intervals.

Each sample was poured dropwise into acetone while stirring the latter at room temperature in a Waring blender, the resulting coagulate was filtered off and washed with more acetone and dried; then its I.V. was determined (in conventional manner at a concentration of 0.5 g/100 ml in a 60/40 phenol: tetrachlorethane mixture). The I.V.s for the samples taken at the indicated times after the dissolution point were: 15 minutes, 0.16; 30 minutes 0.14; 60 minutes 0.12; 120 minutes 0.10. It will be understood that this measures only the average molecular weight of the portion of the reaction mixture which is insoluble in the coagulant and that still lower molecular weight species of "fragmented PET" remained in solution; thus the average molecular weight of the whole PET-ABA reaction product was substantially below that represented by the I.V. figures given above.

More particularly, the above-mentioned coagulation at 120 minutes gave an amount of coagulate equivalent to about 55% of the amounts of reactant, indicating that some 45% of the reaction product was of such low molecular weight as to remain in solution in acetone. Measurement of the amount of acetic acid which had evolved from the reaction mixtures up to the end of that 120 minute period indicated that some 14% of the acetoxy groups had been split off. Thus the fragmented polyester at the 120 minute reaction time was made up of ethylene units, terephthalate units, oxybenzoate units and acetyl units, with the number of acetyl units being almost as large as the number of oxybenzoate units (i.e. the ratio of acetyl units to oxybenzoate units was well above 75:100 such as about 85:100).

EXAMPLE 5

The copolyester of 80 mole % ABA and 20% PET obtained from Tennessee Eastman as "X7H", and believed to be made by the process of Kuhfuss et al U.S. Pat. No. 3,778,410, was used as such, or blended with the fillers indicated in the tabulations below, and injection molded to form bars ($\frac{1}{8} \times \frac{1}{2} \times 5$ inches); these had the following properties:

|  | X7H | 50% X7H 50% Wollastonite | 50% X7H 50% Mica | 50% X7H 50% Talc | 50% X7H 50% Talc Dried @ 200° C. | 40% X7H 20% Fiberglass 40% Talc |
|---|---|---|---|---|---|---|
| Tensile Modulus (psi) | 857,000 | 1,320,000 | 1,950,000 | 1,310,000 | 1,130,000 | 1,950,000 |
| Tensile Strength (psi) | 11,600 | 3,960 | 4,350 | 5,050 | 5,590 | 7,730 |
| % Elongation | 2.9 | 0.35 | 0.25 | 0.47 | 0.63 | 0.47 |
| Flexural Modulus (psi) | 813,000 | 1,250,000 | 1,880,000 | 1,270,000 | 1,250,000 | 1,990,000 |
| Flexural Strength (psi) | 13,100 | 7,380 | 8,460 | 8,760 | 10,000 | 13,100 |
| Notched Izod Impact Strength (ft-lbs/in. of notched) | 1.2 | 0.37 | 0.31 | 0.32 | 0.37 | 0.70 |
| Heat Distortion Temperature 264 psi, $\frac{1}{8}$" bar | 114 | 110 | 151 | 140 | 142 | 167 |
| Heat Distortion Temperature 66 psi, $\frac{1}{8}$" bar | 177 | 177 | 196 | 192 | 184 | 234 |
| MF$_{10}$ (44 psi), 350° C. dg/min. | 4,980 | No Flow | 1,978 | 3,720 | 1,740 | 672 |
| Deformation after exposure at 260° C. for one hour | 0.315" |  | 0.385" | 0.270" |  | 0.010" |

Notched Izod Impact Strength is determined by ASTM D-256.
Heat Distortion Temperature is determined by ASTM D-648.
MF$_{10}$ measured on pellets before injection molding. It was found that there is little, if any, change in MF$_{10}$ on molding.
Deformation after exposure at 260° C. for one hour is determined as in Example 2 above.

The wollastonite used in this Example was "Nyad 400" (400 mesh size) from Nyco Inc. The mica was very fine particle size muscovite mica sold as "S-211" by Whittaker, Clark & Daniels. The fiberglass was Owens-Corning grade P19B-X1, $\frac{1}{8}$ inch fibers. The talc was Mistron Vapor talc, discussed above.

While the reaction processes of this invention are particularly suitable for producing copolyesters in which the proportion of oxybenzoate units is above 80 mole % (mole ratio of oxybenzoate to terephthalate units greater than 80:20), these processes may also be used in making moldable copolyesters of lower oxybenzoate contents, e.g. 80%, 70% or less.

In place of the diphenyl sulfone used as the substantially inert high boiling solvent in the foregoing Examples, other solvents may be employed, e.g. other diaryl sulfones such as ditolyl sulfone or phenyl tolyl sulfone. The boiling point of the solvent is preferably above about 300° C.

Other entrainers besides the diphenyl ether and dichlorobenzene are trichlorobenzene, tetrachlorobenzene, ditolyl ether or other substituted diphenyl ethers.

It is within the broader scope of the invention to use, in place of PET (or in admixture therewith), other alkylene terephthalates such as 1,4-butylene terephthalate or the terephthalate of 1,4 cyclohexanedimethanol. For the alkylene terephthalates of higher aliphatic content, such as the 1,4-butylene terephthalate, higher molar proportions (e.g. 90%) of ABA or other acyloxy aromatic carboxylic acids may be required to attain a softening temperature above 260° C.

It is also within the broader scope of the invention to use other acyloxy aromatic carboxylic acids, in place of the ABA (or in admixture therewith) such as those listed in U.S. Pat. No. 3,778,410 or 6-acetoxy-2-naphthoic acid.

Although the invention has been described in detail with reference to preferred embodiments, it will be understood that variations and modifications can be made.

We claim:

1. Molded cookware resistant to heat distortion and suitable for use in microwave and convection ovens and having a softening temperature of greater than 240° C. molded from a) a random copolyester consisting of the following units:

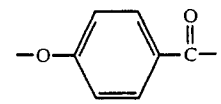  (I)

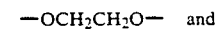 and  (II)

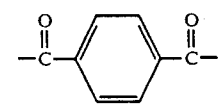  (III)

and
b) a mineral filler,
said random copolyester having 82 to 87 mol percent of unit I based upon the total moles of units I and III, and produced by the process consisting essentially of the following steps:
(i) reacting polyethylene terephthalate with an amount of acetoxybenzoic acid which constitutes from about 60 to 80 mole percent of the total moles of units I and III in the copolyester; and
(ii) gradually adding to the reaction product of (i) a solution of acetoxybenzoic acid in a high boiling solvent, while maintaining the reaction mixture at a temperature above about 240° C., to form a reaction mixture comprising a slurry of insoluble polymer particles in a solution of soluble polymer, said acetoxybenzoic being added in an amount which is the difference between the total amount of acetoxybenzoic acid intended for reaction with said polyethylene terephthalate and the amount of acetoxybenzoic acid utilized in step (i) above; wherein the rate of addition of said acetoxybenzoic acid solution is controlled such that the weight ratio of unreacted acetoxybenzoic acid to copolyester in the reaction mixture is less than about 1:20, and the concentration of acetoxybenzoic in said solution of soluble polymer is less than about 1%.

2. Cookware as in claim 1 in which said copolyester has an $MF_{10}$ at 350° C. of less than 5000 dg/min.

3. Cookware as in claim 1 in which said copolyester has an $MF_{10}$ at 350° C. of less than 500 dg/min., said copolyester being injection-moldable.

4. Cookware as in claim 3 in which said copolyester has an $MF_{10}$ at 350° C. of about 1 to 200 dg/min.

5. Cookware as in claim 1 in which said copolyester has an oxybenzoate content of about 83 mole percent.

6. Cookware as in claim 1 in which said copolyester has an $MF_{10}$ at 350° C. of about 10 dg/min.

7. Cookware as in claim 1 in which said filler comprises talc and the mineral filler content of said blend is about 20 to 60 percent.

* * * * *